United States Patent [19] [11] 4,113,067
Coons et al. [45] Sep. 12, 1978

| [54] | COOLING FLUID CIRCULATION IN AN ANNULAR DISC BRAKE |
|---|---|
| [75] | Inventors: Robert R. Coons, Indian Head Park; Richard G. Hennessey, Oak Lawn, both of Ill.; John Woffenden, Rotherham, England |
| [73] | Assignee: International Harvester Company, Chicago, Ill. |
| [21] | Appl. No.: 811,499 |
| [22] | Filed: Jun. 30, 1977 |
| [51] | Int. Cl.² ............................................. F16D 65/84 |
| [52] | U.S. Cl. .................... 188/71.6; 92/181 R; 92/186; 188/264 E; 192/70.12; 192/113 B |
| [58] | Field of Search ......... 188/264 E, 264 F, 264 CC, 188/264 P, 71.6, 366; 192/70.12, 113 B, 85 AA, 58 C, 59; 92/181 R, 181 P, 186, 129, 107 |

[56] References Cited
U.S. PATENT DOCUMENTS

| 2,178,017 | 10/1939 | Fedden et al. ................. 192/85 AA |
| 2,518,016 | 8/1950 | Johnson et al. ............... 188/264 E X |
| 2,934,177 | 4/1960 | Kelley et al. ..................... 188/264 E |
| 3,081,854 | 3/1963 | Snyder ........................ 192/85 AA X |
| 3,145,816 | 8/1964 | Lorean et al. ................ 192/113 B X |
| 4,011,930 | 3/1977 | Coons et al. ................. 188/264 E X |
| 4,022,298 | 5/1977 | Malinowski ................. 188/264 E X |

Primary Examiner—George E. A. Halvosa
Attorney, Agent, or Firm—Douglas W. Rudy; Ronald C. Kamp; F. David AuBuchon

[57] ABSTRACT

Fluid passages machined in the annular brake piston and in the outboard brake ring of a wet disc brake system allows the circulation of cooling and lubricating fluid. An annular disc brake will deliver cooling fluid to the circumferential periphery of the brake disc operating cavity where the fluid relief passages machined in the annular brake piston and in the outboard brake ring will allow the passage of this fluid out of the brake disc operation cavity thus preventing the stagnation of cooling fluid in the brake disc operating cavity.

4 Claims, 5 Drawing Figures

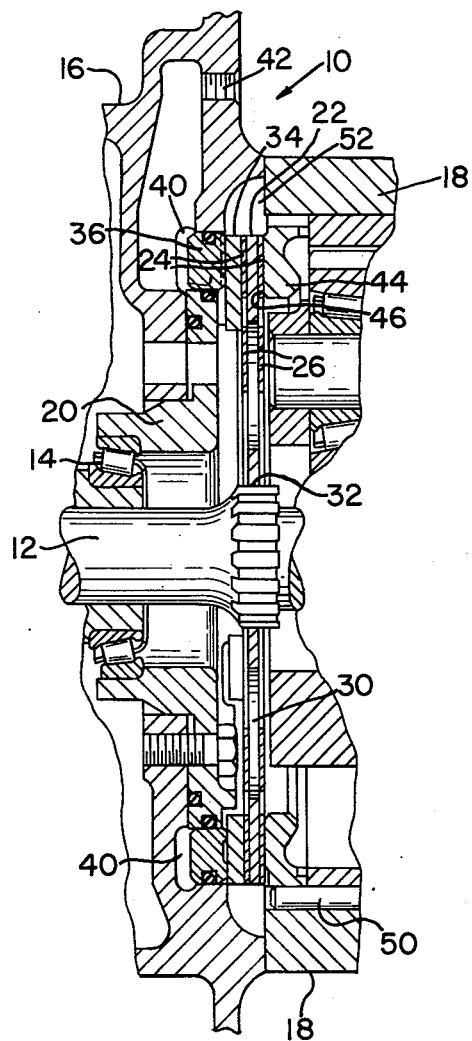
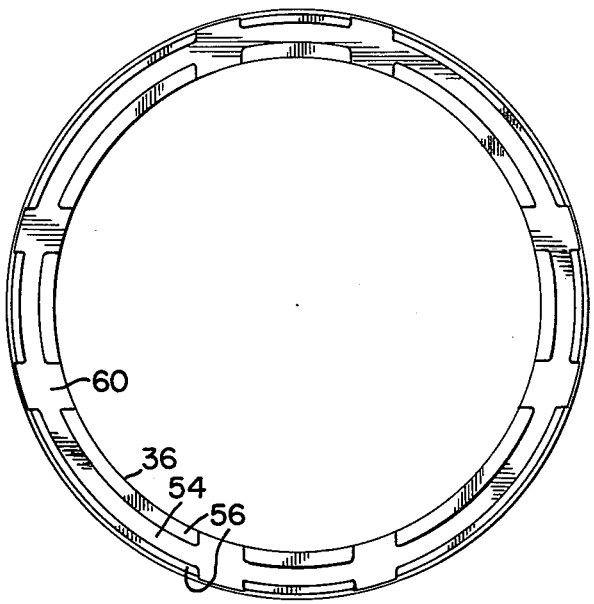
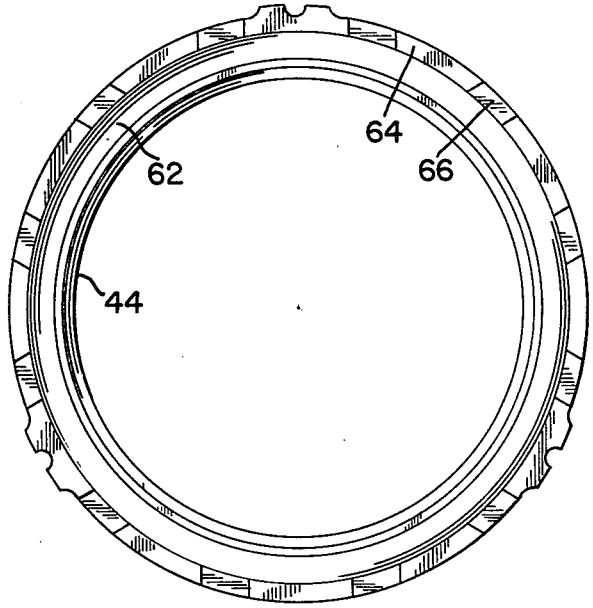

COOLING FLUID CIRCULATION IN AN ANNULAR DISC BRAKE

BACKGROUND OF THE INVENTION

1. Field of the Invention

This invention relates to annular disc brake systems operating in a fluid environment. More specifically, this invention relates to providing a braking system that allows circulation of lubrication and cooling fluid through the use of machined fluid passages in the system annular piston and the system outboard brake ring.

2. Description of the Prior Art

Wheel brakes carried on axles residing in a fluid bath are in contemporary use on vehicles such as farm and construction machinery. Typically agricultural and industrial tractors are equipped with inboard brakes for the rear axle. These inboard brakes may be disc brakes which operate in a fluid bath also serving as a source of fluid for hydraulic components of the tractor as well as a lubricant for the differential. Such brake systems utilize an annular piston to apply pressure to a disc which is splined to an axle or a planetary drive shaft. The opposite face of the disc adjoins the stationary outboard brake ring and is in contact with it during braking. Frictional surfaces on opposite sides of the disc having a lining of microscopically porous paper-like material bonded thereto. While the brake disc will generally have a splined central aperture compatible with the splines on the vehicle drive axle or planetary drive shaft. In addition to the central aperture it is usual to find a plurality of radially disposed apertures in the brake disc between the splined central aperture and the frictional surface or lining on the disc which allow fluid to pass from one side of the disc to the other side of the disc thus allowing the benefit of cooling fluid to reach the frictional surface on either side of the disc. To enhance the utility of the apertures the brake disc might also be equipped with an oil baffle ring to assist in delivery of cooling fluid to the lining material.

Through normal braking the heat buildup in the lining material is significant. The fluid bath in which the brake operates will generally work with the brake disc to provide a media to dissipate heat from the lining material. However, there are extreme instances where the brake disc will be rotating through the fluid bath at such a rate that it is difficult to maximize the transfer of heat between the lining material of the brake disc and the fluid bath. In these instances it has been found that increased lubrication and cooling effectiveness can be attained if fluid from the fluid bath can be pumped to and over the frictional surface of the disc.

A more conventional brake system provides cooling and lubricating oil to the lining material by either dipping the friction material into the fluid and/or the more costly means of causing the fluid to flow across the lining material surface by a forced or pressurized lubrication system. The means provided by this invention strives to improve a heat transfer between the lining material and the cooling fluid by increasing the opportunity of fluid circulation from the fluid sump to the other periphery of the brake disc.

Contemporary state of the art of fluid environment brake systems generally do not provide for sufficient circulation of fluid to ensure optimum cooling and lubrication of the brake disc lining material.

The major object of this invention is to provide the dissipation of heat in a wet disc improve system by improving the circulation of cooling fluid.

SUMMARY OF THE INVENTION

This invention is concerned with improving cooling fluid circulation in annular brake systems operating in fluid baths. Generally this wet brake system depends on the operation of dipping the brake disc in the fluid bath or sump to effect heat transfer between the lining material and the cooling fluid.

The brake disc in this system pumps cooling and lubricating fluid past the brake disc lining material. The fluid relief passages machined in the annular piston and the outboard brake ring allow fluid to pass either the sump or reservoir rather than being restrained under pressure in the brake disc operating cavity.

The disc brake operates in a housing supporting a rotatable shaft. The housing includes an annular piston bore in which the annular piston is carried. Pressurizing the annular piston chamber urges the annular piston against a non-rotating inboard brake ring which is urged against the brake disc which is integrally but slidably carried on said rotatable shaft to rotate therewith. A non-rotating outboard brake ring resists further lateral displacement thus tending to restrict rotation of the brake disc.

Cooling fluid is picked up by the brake disc from the sump in the housing and is discharged radially. A plurality of communication notches in the annular piston and a plurality of fluid access channels in the outboard brake ring allow fluid to drain or be forced from an annular circumferential channel encircling the brake disc.

BRIEF DESCRIPTION OF THE DRAWINGS

FIG. 1 is a cross sectioned view of a portion of a vehicle drive axle incorporating an annular brake assembly;

FIG. 2 is a plan view of the front side of an annular brake piston;

FIG. 3 is a plan view of an outer brake ring;

DETAILED DESCRIPTION OF THE DRAWINGS

Figure 4:
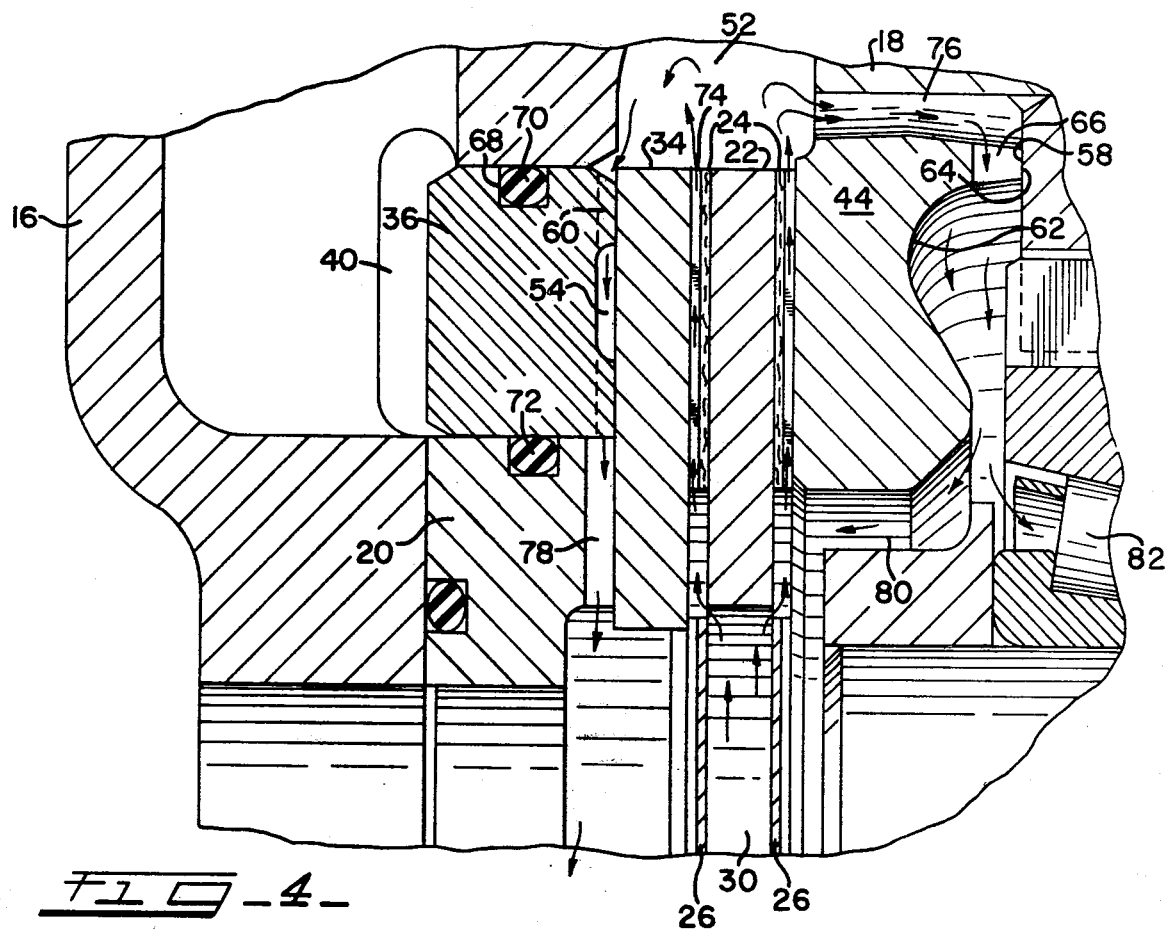
FIG. 4 is an enlarged portion of a section of the annular brake assembly of FIG. 1.

The brake systems of various heavy duty vehicles often incorporate annular type disc brakes operating in a fluid environment. The fluid is oftentimes hydraulic fluid serving a dual function as a lubricant and as a brake coolant. This type of brake system generally 10 is shown in FIG. 1. In this embodiment the brake is used to selectively restrain a planetary drive shaft 12 rotatably carried by a bearing 14 within a housing 16 and a bearing support 20. The housing 16 consists of several components which are secured together and function as a unitary structure capable of acting as a reservoir for a quantity of lubricating or cooling fluid.

The annular brake mechanism 10 includes a brake disc 22 having a lining material 24 bonded to the opposite faces, which are major planar surfaces, thereof. The brake disc 22 is splined to the planetary drive shaft 12 so that it may be axially slideable on the planetary drive shaft 12 and the splined area thereof while also rotating with the planetary drive shaft 12. The brake disc 22 may have a fluid baffle ring 26 bonded to opposite sides of it. The fluid baffle ring 26 partially covers each of a plurality of radially exposed apertures 30 provided in the brake disc 22 in the area between the splined central aperture 32 of the brake disc and the outer diameter area of the brake disc which hosts the lining material 24. These apertures allow fluid flow past or through the brake disc while at the same time reducing the weight of the brake disc.

Inboard reaction ring or brake ring 34 is retained within and is movable with respect to the housing 16 axially of the planetary drive shaft 12. (In this specification "inboard" indicates a locaton closest to the center of the vehicle which is the left sides of FIGS. 1 and 4.) The brake ring 34 has a flat surface formed on one side for engagement with the inboard (left) brake surface of the disc 22 (lining surface 24). The obverse side of the brake ring 34 is also a flat surface for contact with an annular piston 36. The inside diameter of the brake ring 34 is equipped with three lugs which are slideably accommodated by three apertures in the bearing support or carrier 20. This engagement between the inner brake ring 34 and the bearing carrier 20 allows the brake ring to move axially without allowing rotation.

The annular piston 36 may be displaced through the pressurization of annular cavity 40 through port 42. This would force the annular piston 36 into contact with the inboard brake ring 34 and in turn against the brake disc 22 resulting in restraining movement of the planetary drive shaft 12.

The brake disc 22 is backed up by an outboard brake ring 44 having a flat inboard surface 46 for contact with the brake disc 22. The outboard brake ring is provided with three dowel pin receivers to accommodate dowel pins such as 50 fixedly carried in the rear axle carrier 18 of the housing 16.

A fluid passage 52 extends annularly around the periphery of the brake disc 22 accommodating fluid which is radially discharged by the rotating bfake disc 22 when the host vehicle is in motion. Fluid in this passage is then allowed to drain back to the lower portion of the sump by means of passages machined on the surfaces of the brake piston 36 and the outboard brake ring 44.

The crux of the invention concerns these provisions for enhancing fluid flow from the fluid passage 52. In order to illustrate the improvements FIGS. 2 through 5 should be considered.

In FIG. 2 the outboard side of the annular piston 36, which is the face capable of contacting the inboard reaction or brake ring 34 obverse to the hydraulic pressure side of the piston, is shown. A channel 54 is machined in the face of the piston. Contact surfaces, as exemplified by 56, are the working surfaces of the annular piston 36 that contact the inboard side of the inboard brake ring 34. Communication notches or passages, one characterized by reference character 60, have also been machined on this surface of the brake piston. Eight communication notches are shown in the FIG. 2 brake piston.

FIG. 3 presents details of the outboard surface of the outboard brake ring 44. An annular depression 62 is machined in this surface. Force transmitting surfaces such as 64 represent the thickest portion of the outboard brake ring 44. Fluid access channels, one of twelve shown as 66, allow fluid passage from the outer diameter of the outboard brake ring 44 to the inner diameter thereof.

A clearer understanding of the cross sectional shapes of both the brake piston and the outboard brake ring can be gleaned by the enlarged sectioned view of FIG. 4.

The annular piston 36 shows, in cross section, the channel 54. One of the communication notches 60 is represnted by the hidden line. Also shown in this view is a circumferential groove 68 in the outer peripheral surface of the annular piston 36. This groove 68 accommodates an O-ring seal 70 which aids in preventing fluid from passing between the annular cavity 40 and the fluid passage 52. A second O-ring seal 72 resides in a circumferential groove in the bearing support 20 for the same reason.

The outboard brake ring 44 exhibits the annular depression 62 and the fluid access channel 66. The force transmitting surface is surface 64 which normally abuts a fixed surface 58.

Other significant components shown in FIG. 4 include the brake disc 22 having lining material 24 bonded to both faces thereof. The fluid baffle rings 26 are also bonded to the brake disc 22 bridging the radially disposed aperture 30. The inboard brake ring 34 is also shown. Housing 16 generally encapsulates the brake means and provides a fluid reservoir.

Figure 5:
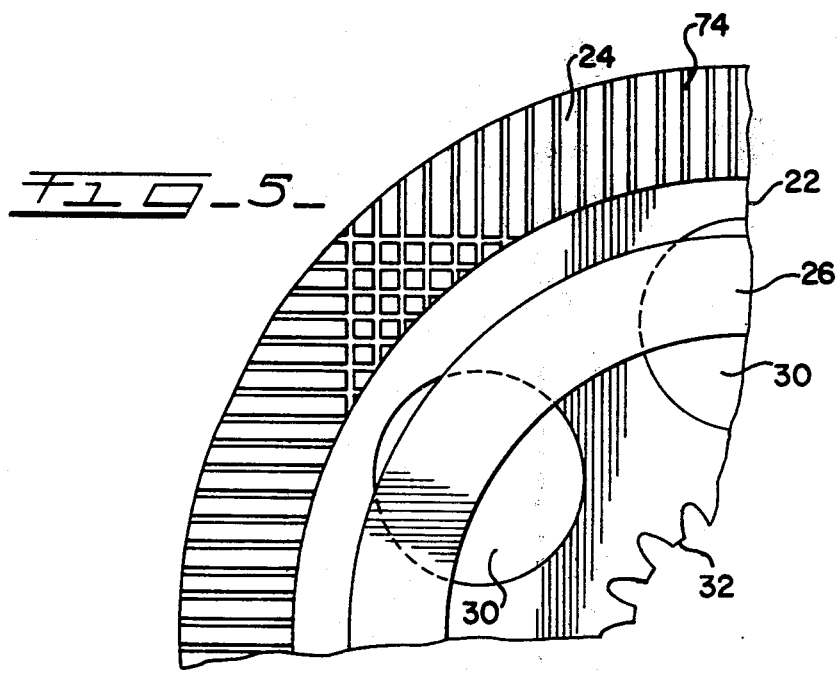
FIG. 5 is a plan view of a quadrant of a frictional brake disc for use in an annular brake assembly.

FIG. 5 is a portion of the brake disc 22 showing the lining material 24 of only one surface, the fluid baffle ring 26 covering the radially disposed aperture 30, and a portion of the splined central aperture 32. Of significance in the view is the plurality of cooling fluid passages such as 74 which are machined in the lining material 24. One set of these passages is generally perpendicular to a second set of passages in this embodiment, however, this configuration is optional. The function of the cooling fluid passages 74 is to allow fluid to flow from the inner periphery of the lining material to the outer periphery thereof to provide a passage for media (circulating flud) to carry heat away from the working surface of the brake disc.

MODE OF OPERATION

As previously pointed out in this specification a problem with prior art wet brake devices was that the circulating fluid had no egress after eing radially discharged from the brake disc. The fluid would tend to be static thus generating localized heat cavities. The instant invention eliminates this problem by providing passages in the annular piston 36 and the outboard brake ring 44 that allow the circulation of the cooling fluid.

FIG. 4 best presents the circulatory paths taken by the cooling fluid. Cooling flud is picked up from the fluid sump by the radially disposed apertures 30, the fluid baffle rings 26 and the cooling fluid passages 74 in the lining material 24. The fluid is pumped by centrifugal force from the inner sections of the brake disc 22 outward as indicated by the arrows heading upward on the figure. When the cooling fluid reaches the fluid passages 52 it is under enough pressure to tend to pump fluid past the annular piston 36 through communication notches 60 and around the outboard brake ring 44 via clearance space 76, fluid access channel 66 and into an open zone 80 inboard of the inside diameter of the outboard brake ring 44.

Fluid passing between the annular piston 36 and the inboard brake ring 34 via communication notches 60 will generally rejoin accumulated fluid in the lower portion of the housing 16 through gravitational assist. Fluid passing behind the outboard brake ring 44 will optimally be directed into a bearing assembly 82, thence by gravity to the lower porton of the housing; or this fluid may mingle with fluid being pumped past the brake disc lining material.

It can be appreciated from FIG. 4 that if communication notches 60 and fluid access channels 66 were not provided fluid in fluid passage 52 would be static thus preventing the circulation of cooling fluid which has been found to greatly increase the effectiveness of this brake system (Note that fluid passage 52 is not generally an open passage.)

A wet brake lubricating and cooling fluid circulation system has been disclosed to meet the objects and advantages set forth above. Some modifications to the invention are possible without deviating from the intent, scope and spirit of this application. For instance, the annular piston can be reversed relative to the outer brake ring such that the piston would be accommodated in the rear axle carrier and the outer brake ring would reside in the inboard portion of the housing. This application intends to protect such nuances of design.

What is claimed is:

1. A disc brake operating in a fluid environment comprising:
    a housing, including a brake disc operating cavity including an annular fluid passage;
    a reservoir source of fluid contained in said housing;
    a rotatable shaft carried in said housing;
    a brake disc including radial braking surfaces slideably carried on said rotatable shaft for rotation therewith, said brake disc partially submerged in said reservoir source of fluid, said brake disc having means to pump said fluid by centrifugal force from the radial surfaces of said brake disc to said annular fluid passage said annular fluid passage being located immediately circumferential to the outer periphery of the brake disc;
    an inboard brake ring having flat surfaces on both sides thereof carried in said housing circumferentially disposed around said rotatable shaft, said inboard brake ring being adjacent said brake disc;
    an annular piston carried in said housing circumferentially disposed with respect to said rotatable shaft, said annular piston having plurality of communication notches for allowing fluid to pass from said annular fluid passage to sid reservoir source of fluid and a circumferential annular channel formed in the outboard face thereof, said outboard face of said annular piston being adjacent said inboard brake ring;
    an outboard brake ring adjacent said brake disc on the side opposite said inboard brake ring, fixedly mounted in said housing circumferentially disposed around said rotatable shaft, said outboard brake ring having a flat surface adjacent said brake disc and a contoured surface having a plurality of force transmission surfaces engaging said housing, a plurality of fluid access channels for allowing fluid to pass from said annular fluid pasage to said reservoir source of fluid and an annular depression therein;
    whereby said communication notches in said annular piston and said fluid access channels in said outboard brake ring provide egress for fluid pumped into said annular fluid passage of said housing by said brake disc thereby allowing circulation of cooling fluid past said brake disc.

2. The invention in accordance with claim 1 wherein said brake disc comprises:
    a flat disc having a plurality of apertures therethrough including a central splined aperture and radially disposed apertures;
    lining material affixed to the outer area of both major planar surfaces of said disc;
    fluid baffle rings affixed to the central area of both planar surfaces partially covering said radially disposed apertures of said flat disc.

3. The invention in accordance with claim 1 wherein said fluid will be evacuated from said annular fluid passage into secondary fluid passages in said housing, said secondary fluid passages including clearance (76), open zone (80) and inboard passage (78).

4. The invention in accordance with claim 3 wherein said fluid may pass from said clearance (76), through said fluid access channel (66) to the bearing assembly (82).

* * * * *